United States Patent Office 3,012,438
Patented Dec. 12, 1961

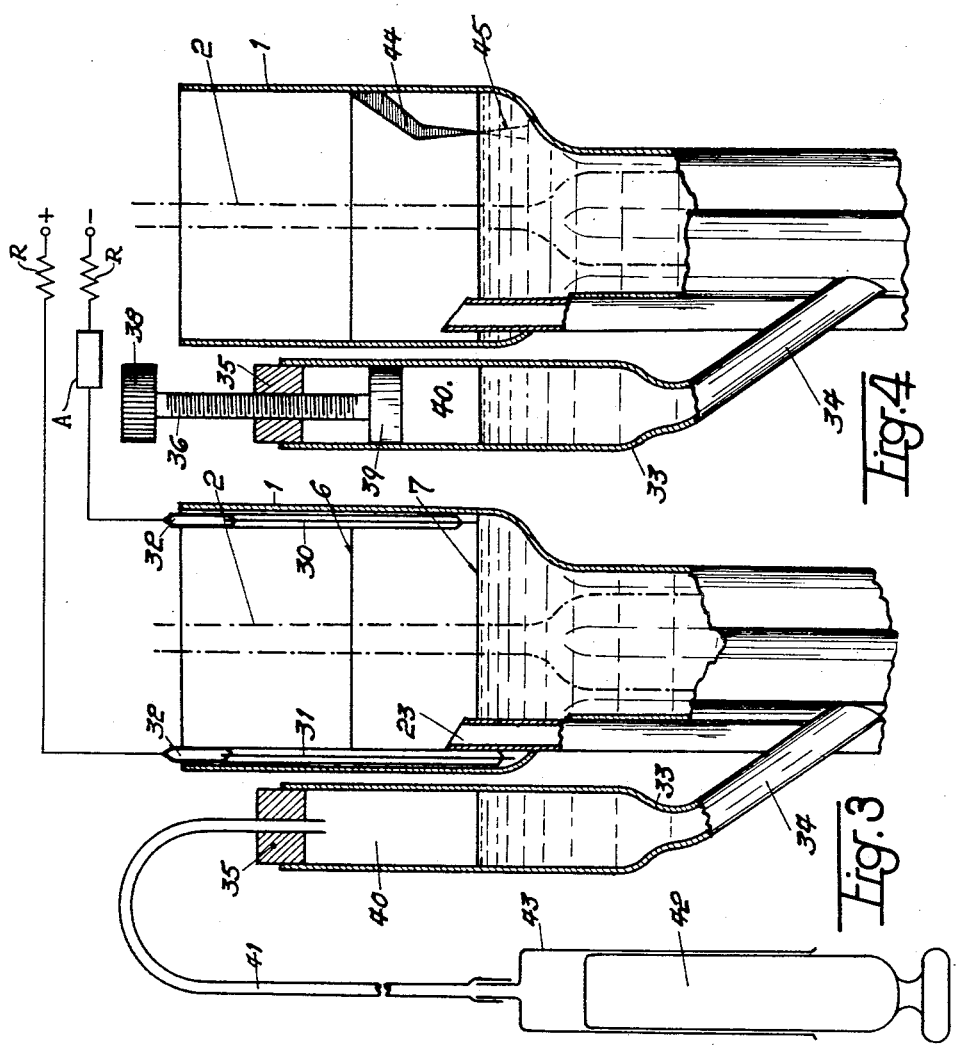

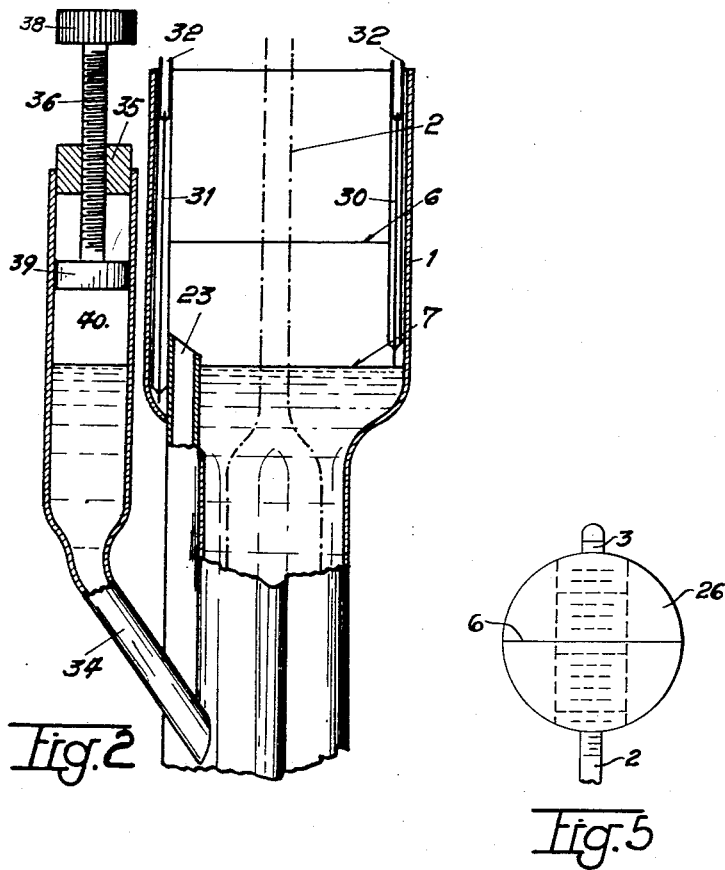

3,012,438
APPARATUS FOR MEASURING THE DENSITY OF LIQUIDS
Raymond Pochan, Chardonnay par Uchizy, Saone-and-Loire, and André Pochan, Montesson, Seine-and-Oise, France
Filed Oct. 1, 1957, Ser. No. 687,525
Claims priority, application France Mar. 17, 1951
2 Claims. (Cl. 73—447)

This invention relates to apparatuses for measuring the density of liquids embodying Archimedes' principle, such as aerometers and aeroscopes.

The present application is a continuation-in-part of our co-pending application Serial No. 276,504 filed on March 14, 1952, now Patent No. 2,878,676.

The invention has for its principal object to provide various types of aeroscopes which are characterized by the fact that they comprise, in combination with a test tube of a transparent material fit for containing the liquid and receiving the aerometer, means for bringing the level of the liquid to a distance from a reference plane absolutely constant, fixed and precise, in which is effected the reading of the aerometer.

A further important object of the invention is to provide a modified form of aeroscope applicable to ionized liquids even in a very low proportion such as bi-distilled water, which comprises, inside the test-tube, two electrodes of a metal unattacked by the liquid of a density to be determined, connected to an electrical circuit, the closing of which controls an appropriate visible or audible signal, with one of said electrodes being adapted to be immersed more or less deeply into the liquid, while the tapering extremity of the other is included in a horizontal plane corresponding to the level to be obtained, and means, such as a movable mass capable of being immersed into the liquid, being provided to make it possible to gradually raise the level of the liquid in the test-tube to bring it into contact with the extremity of said electrode. This modification allows extremely accurate determinations of the density ionized liquids provided that the corrections due to the surface tension, the air-pressure and the hygrometric state of the ambient air be made in the results obtained.

A further object of the invention is to provide means for displacing the liquid within an aeroscope test-tube by air or gas under pressure to raise the liquid to a given level.

The following complementary description with reference to the appended drawings given by way of non limitative examples is intended to show how the invention can be carried out, the characteristics appearing from the description and the drawings as well being, of course, part of the invention. In the drawings:

FIG. 2 is a partial section view of the upper part of the test-tube of an aeroscope including a device for bringing the liquid to the desired level for determining the density of ionized liquids.

FIG. 3 is a partial sectional view of the upper part of the test-tube of an aeroscope including a modified form of device for bringing the liquid to a desired level by air or gas under pressure.

FIG. 4 is a similar view showing a device for bringing to the desired level high viscosity liquids.

FIG. 5 is an enlarged view of the lens and the neck of the aerometer showing the scale thereon as parts of the present apparatus.

Figure 1:
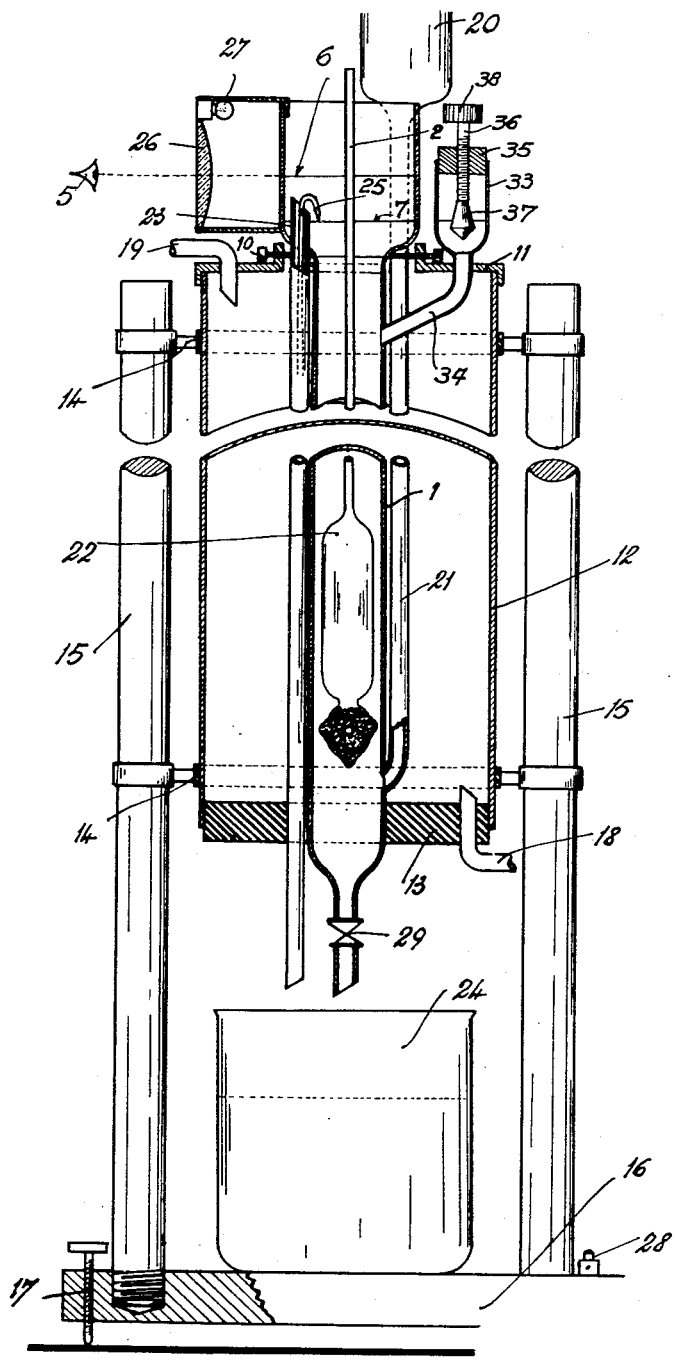
FIG. 1 is a general elevational view, with a partial vertical axial section, of an embodiment of an improved aeroscope according to the invention.

Referring more particularly to FIG. 1, the reference 1 denotes the test-tube which is centered by means of screw 10 in a flange cap forming at its upper part a glass or plastic material jacket 12 surrounding the test-tube 1 and associated to it, at its lower part, through a rubber joint 13. The jacket 12 which supports in this way the aeroscope, is supported, in turn, by collars 14 connected to said jacket and each encircling one of two tubular columns 15, fixed on a base 16. A plumb line, housed in a vertical tube (not shown) makes it possible to render the apparatus vertical by means of two micrometer screws such as 17, screwed in the base 16. Constancy of the temperature is ensured by a thermostat regulated liquid admitted in the jacket 12 through a pipe 18 and flowing out of it through a pipe 19.

The liquid, the density of which it is desired to determine, is poured into the test-tube 1 through a funnel 20 which communicates through a duct 21 with the lower part of the test-tube in which the aerometer 22 is placed. This liquid fills the test-tube up to the top of an over-flow pipe 23, the upper orifice of which is inside the test-tube, at a certain distance under the circular line 6 engraved on the surface of the test-tube 1, the excess of the liquid being evacuated at the bottom of the tube 23 into a beaker 24 placed on the base 16.

The reading is effected through a sighting device such as a lens 26 without parallax, lighted by an electric lamp 27, and the optical axis of which is included in the reference plane formed by the circular line 6 with the eye 5 of the operator being in the same plane. An interrupter 28 secured on the base 16 allows to light up the lamp 27 so that the reading can be effected by night.

The eye of the operator being placed in the reference plane 6 formed by a circular line drawn on the surface of the test-tube 1 looks at and reads the graduation of the scale 3 on the neck of said aerometer at a constant distance over the general level 7 of the liquid in the test-tube 1. This liquid fills the test-tube up to the top of an over-flow pipe 23, the upper orifice of which is inside the test-tube, at a certain distance under the circular line 6 engraved on the surface of the test-tube 1. Said pipe 23 still plays its part as evacuator of the superficial layer of the liquid and makes it possible to eliminate the foams that might float on the top as in the case of milk. In the upper part of the test-tube 1 are positioned as shown in FIG. 3, two electrodes 30 and 31 welded to thimbles 32 which permits the connection thereof to an electric circuit, see FIG. 3, and includes a visible or audible signal A, as described in the aforementioned copending application. The lower extremities of the electrodes 30 and 31 are at offset levels with respect to each other, the extremity of the higher electrode 30 being in a horizontal plane corresponding to the fixed and constant general level 7 to be obtained. It is the latter electrode 30 that constitutes the index-electrode.

To the test-tube 1 is juxtaposed an auxiliary tubular capacity 33 which communicates with the interior of the test-tube through a pipe 34. Said capacity is closed by a plug 35 in which a threaded rod 36 is screwed, carrying at its lower extremity a levelling mass 37 and, at its upper end, a milled control knob 38.

The filling of the test-tube is effected through a funnel 29 and the excess of liquid is evacuated through the over-flow pipe 23 as in our co-pending application. Thereafter the level of the liquid is brought back into contact with the upper index electrode by lowering the mass 37, immersed in the liquid, through screwing the threaded rod 36. The electric contact then closes the electric circuit and operates the signal A, see FIG. 3.

In this embodiment, the level of the liquid is displaced into contact with the upper index electrode by the immersion of the mass 37. The same displacement can be obtained by varying the air-pressure above the level of the liquid in the capacity 33. The advantage of such an embodiment is that the mass 37 need not be cleaned.

As shown in FIG. 2, to the test-tube 1 is juxtaposed an auxiliary tubular capacity 40 which communicates with the interior of the test-tube through a pipe 34. Said capacity is closed at its upper part by a tapped plug 35 in which a threaded rod 36 is screwed carrying at its lower extremity a piston 39. The latter moves in the capacity 40 and compresses or decompresses the air contained in said capacity.

This pressure or decompression permits the operator to obtain a new level 7 of the liquid in the test-tube 1.

The filling of the test-tube 1 being effected as in the co-pending application, when the overflow pipe 23 has achieved its purpose, a small amount of the liquid is evacuated as in the co-pending application. Then the level of the liquid 7 is brought back into contact with the index-electrode by lowering the piston 39 by screwing the threaded rod 36 by means of the milled knob 38. The electric contact then closes the electric circuit and operates the visible or audible signal A.

As shown in FIG. 3, which shows an embodiment of the invention more particularly adapted for testing liquids of low viscosity, the variation of the air-pressure above the level of the liquid can be obtained through a syringe comprising a piston 42 adapted to be displaced in a cylinder 43 and connected to the auxiliary capacity 40 through a tube 41.

FIG. 4 illustrates diagrammatically the upper part of the test-tube of an aeroscope for determining the density of high viscosity non-ionized liquids. The structure of this device is similar to that of the apparatus illustrated on FIG. 3 with the exception that the determination of the constant level 7 is obtained by means of a tapering index 44 made of a metal unattacked by the liquid or of a colored enamel, providing a virtual image 45 on the superficial layer of the liquid. The piston 39, which is operated like in the case of FIG. 2, makes it possible to raise the level of the liquid to bring the point of the index 44 into contact with its image 45. The reading is then effected like in the examples that have been described.

What we claim is:

1. Aeroscope more particularly designed for measuring the density of ionized liquids, comprising a transparent test-tube adapted to contain the liquid to be tested, a measuring aerometer positioned in said tube, an electrode of a metal resistant to attack by said liquid positioned inside said test-tube and extending into said liquid, a second electrode also of a metal resistant to attack by said liquid and positioned within said test-tube with one extremity of the latter electrode being tapered and included in a horizontal plane corresponding to a given level of said liquid, an electrical circuit to which said two electrodes are connected, a signal controlled by the closing of said electrical circuit, an auxiliary cylindrical tube connected to said test-tube for receiving liquid therefrom, a piston slidably mounted in said auxiliary tube for varying the pressure above the liquid therein, controlling the level of said liquid and causing same to gradually be raised in said test tube for being brought into contact with the tapering extremity of said second electrode closing said circuit operating said signal, and means for taking the reading of said aerometer in a reference plane located at an accurately fixed distance from said horizontal plane when said liquid has been raised to said plane.

2. An aeroscope comprising a vertically positioned transparent test-tube for containing the liquid to be tested, a pair of electrodes extending into the upper portion of said test-tube with one electrode extending longitudinally of said tube a predetermined greater distance than the other of said electrodes, indicating means electrically connected to said electrodes for receiving current when liquid within said test-tube contacts both electrodes at one time, reference indicia provided on said test-tube providing a reference for reading an aerometer, an aerometer positioned longitudinally of said test-tube, a second tube connected at one end to said test-tube and in communication therewith, means closing the other end of said second mentioned tube, a flexible tube, a third independent tube connected to said second tube by said flexible tube, a piston slidably mounted in said third tube for being moved and pressing gas on the liquid in the test-tube for raising the same.

References Cited in the file of this patent

UNITED STATES PATENTS

| | | |
|---|---|---|
| 721,744 | Richter | Mar. 3, 1903 |
| 1,607,912 | Peper | Nov. 23, 1926 |
| 1,881,572 | Herz | Oct. 11, 1932 |
| 2,023,196 | Fairchild | Dec. 3, 1935 |
| 2,118,029 | Boyd | May 24, 1938 |
| 2,878,676 | Pochan et al. | Mar. 24, 1959 |

FOREIGN PATENTS

| | | |
|---|---|---|
| 187,484 | Great Britain | Oct. 26, 1922 |
| 656,388 | France | Jan. 2, 1929 |